(12) United States Patent  
Schlack (10) Patent No.: US 9,137,575 B2  
(45) Date of Patent: Sep. 15, 2015

(54) EXTERNAL NETWORK CONTROL OF MEDIA SERVICES

(75) Inventor: John Schlack, Quakertown, PA (US)

(73) Assignee: BEAUMARIS NETWORKS INC., Boxborough, MA (US)

( * ) Notice: Subject to any disclaimer, the term of this patent is extended or adjusted under 35 U.S.C. 154(b) by 26 days.

(21) Appl. No.: 13/276,703

(22) Filed: Oct. 19, 2011

(65) Prior Publication Data

US 2012/0102531 A1    Apr. 26, 2012

Related U.S. Application Data

(60) Provisional application No. 61/405,042, filed on Oct. 20, 2010.

(51) Int. Cl.
```
H04N 21/472    (2011.01)
H04N 21/4227   (2011.01)
H04N 21/61     (2011.01)
```
(52) U.S. Cl.
CPC ..... *H04N 21/47202* (2013.01); *H04N 21/4227* (2013.01); *H04N 21/6125* (2013.01)

(58) Field of Classification Search
CPC .................................................. H04N 21/472
USPC ........... 725/86, 98, 99, 91, 95, 105, 109, 110, 725/93, 62
See application file for complete search history.

(56) References Cited

U.S. PATENT DOCUMENTS

| 5,587,734 | A * | 12/1996 | Lauder et al. .................. 725/139 |
| 8,170,065 | B2 * | 5/2012 | Hasek et al. .................. 370/486 |
| 8,255,960 | B2 * | 8/2012 | Yu .................................... 725/86 |
| 2004/0181800 | A1 | 9/2004 | Rakib et al. |
| 2007/0011717 | A1 * | 1/2007 | Lauder et al. .................. 725/135 |
| 2009/0025052 | A1 | 1/2009 | Schlack et al. |
| 2009/0100477 | A1 * | 4/2009 | Jeffs ................................. 725/86 |
| 2009/0172757 | A1 * | 7/2009 | Aldrey et al. .................. 725/110 |

(Continued)

FOREIGN PATENT DOCUMENTS

WO    WO2012/054583    4/2012

OTHER PUBLICATIONS

Int'l. Search Report mailed Feb. 1, 2012 in corresponding Int'l. Application No. PCT/US2011/056859.

(Continued)

*Primary Examiner* — Benjamin R Bruckart  
*Assistant Examiner* — Tien M Nguyen  
(74) *Attorney, Agent, or Firm* — Patent Capital Group (57) ABSTRACT

A video server delivers video on demand (VOD) and other video services responsive to a remote selection application over an IP network from a personal communication device of a user, such as a cellphone or smartphone. The remote selection application drives a user interface of available content, and transmits a user selection request to the video delivery server via a public access network such as the Internet. The video server correlates the identity of the requesting user with a video services channel in communication with a settop box or similar device of the user, and delivers the content to the client video device for rendering. In contrast to conventional VOD, in which the video services request emanates from the settop box on the same communication path (QAM channel) as the downstream signals containing the VOD content, the remote selection application is independent of the client device on an HFC network.

21 Claims, 5 Drawing Sheets

(56) References Cited

U.S. PATENT DOCUMENTS

| | | |
|---|---|---|
| 2009/0196210 A1 | 8/2009 | Desai |
| 2009/0320077 A1* | 12/2009 | Gazdzinski .................... 725/62 |
| 2010/0017816 A1* | 1/2010 | Martini et al. ................. 725/31 |
| 2011/0053623 A1* | 3/2011 | Rovira et al. ................. 455/507 |

OTHER PUBLICATIONS

PCT Apr. 23, 2013 International Preliminary Report on Patentaability and Written Opinion from International Application No. PCT/US2011/056859.

* cited by examiner

EXTERNAL NETWORK CONTROL OF MEDIA SERVICES

RELATED APPLICATIONS

This application claims priority to and the benefit under 35 U.S.C. §119(e) of U.S. Provisional Patent Application No. 61/405,042, filed Oct. 20, 2010, entitled "IP DEVICE CONTROL OF QAM VIDEO DELIVERY" the contents of which is hereby incorporated by reference in their entirety.

BACKGROUND

Network transmission of video services, such as cable television, video on demand (VOD), and video file downloads continue to proliferate as the network infrastructure continues to evolve to support the high bandwidth demands of applications providing these services. Such a network infrastructure includes headends for providing video services, service nodes for executing applications for delivering the video services, and set-top boxes or other client video device for rendering the service to users. Many video service providers (VSPs) that use hybrid fiber coax (HFC) networks have video on demand (VOD) systems deployed. These systems allow the subscriber to navigate a menu system or search for content to watch, purchase or play the content, and view it on their television using a QAM device (e.g. settop box with two-way RF communications) to receive the content from the network.

Unlike conventional IP networks such as the Internet, a network infrastructure for delivering media services is typically arranged in a fanning out manner from the head end, since the bulk of the message traffic travels from the headend (service provider) to the settop boxes in a so-called downstream direction. Upstream signals, typically control information such as VOD and channel selection requests, travel upstream toward the headend. In contrast to the typical IP network, arranged for roughly equal volumes of bi-directional traffic, the media services network infrastructure accommodates larger volumes of downstream traffic, and generally transports data only between the headend and the settop boxes, not between individual settops.

While generally available programming (i.e. basic cable) is typically available to all set top boxes, in a so-called "broadcast" transmission, other services such as video-on-demand are sent to individual set-top boxes on "narrowcast" channels. In a conventional video services network, each of the set-top boxes receives particular channels, or frequency ranges, for narrowcast video services, generally based on the physical arrangement of the delivery infrastructure connections that branch to different service groups. These frequency ranges, or channels, are thus "visible" to the set top box, and are common to all set-top boxes in the service group. The headend maintains a mapping of set-top boxes to service groups, and further maps each service group to the channels, or frequency ranges, applicable to the group. Thus, when a user requests a service, the headend identifies the set-top box making the request, and identifies the service group and channels assigned to that group for transmitting the service.

SUMMARY

A video delivery server delivers video on demand (VOD) and other video services responsive to a remote selection application over an IP network from a personal communication device of a user. The remote selection application drives a user interface of available content, similar to that presented by a settop box connected to the user's rendering device (TV), and transmits a user selection request to the video delivery server via a public access network such as the Internet. The video delivery server correlates the identity of the requesting user with a video services channel in communication with a client video device, such as a settop box, and delivers the requested video content to the client video device for rendering on the rendering device. In contrast to conventional VOD, in which the video services request emanates from the settop box via an upstream transmission on the same communication path as the downstream signals containing the provided video services, the remote selection application is independent of the client video device such that the video delivery server maps the video services request to the video services channel corresponding to the client video device of the user, typically a quadrature amplitude modulation (QAM) channel in a hybrid fiber coax (HFC) network.

Configurations herein are based, in part, on the observation that conventional settop boxes were developed for efficiently receiving and providing multiple video options through selection of broadcast streams, or channels, and not necessarily with an eye to a robust user interface for narrowcast video on demand (VOD) selectable by individual users.

Unfortunately, conventional controls for video services, such as VOD, suffer from the shortcoming that user interfaces and control for video delivery, typically provided by conventional settop boxes, tends to provide only rudimentary menus and selection capabilities for available media, and often requiring manual paging or scrolling to effectively find a particular offering.

Many web sites and IP device interfaces provide a much richer set of features and capabilities for locating content than the guide on the QAM device (e.g. Hulu™, NetFlix®, iTunes®, etc.). These services have advanced search and navigation features. Some reasons that these sites are able to build better navigation interfaces include the IP platform is a more open and accessible platform and these services leverage standards in the UI such as HTML5 and JavaScript. These navigation interfaces are being deployed on a variety of platforms including personal computers, mobile phones, tablet computers, net books, and even gaming systems.

It would benefit the video service provider to integrate the advanced search and UI capabilities of the IP device with the high bandwidth video delivery of the HFC network and the televisions connected to the QAM devices. Thus, the subscriber searches for content on the IP device, hits a "play" button on the IP device, and the content is delivered through the HFC network to the QAM device to display on the television.

Configurations herein substantially overcome the shortcomings of settop box user interfaces by allowing video selection from an external selection application, such as from a cellphone, smartphone, or similar IP conversant device, and invoking the service provider to "push" the selected content to the user rendering device, rather than "pulling" the service from the settop box. As configurations below illustrate, since the external video selection application operates on an independent personal communication device, there is no direct association between this communication device and the set-top box on which the user desires to receive the service. The service provider receives an identity and service selection from the personal communication device, and the service provider maps the identity to a network location of the settop box.

In the example arrangement, the network location is serviced by a QAM channel (QAMs) in the HFC network, however other transmission formats may be employed. In the HFC network, different QAMs lead to different groups of settop boxes, hence the identity mapping includes referencing discovery information about the HFC network to ensure that the selection is delivered on a QAM available to the settop box. In conventional approaches, the user selection is made at the settop box, which sends the selection upstream to the service provider, where the service destination is identifiable by the originating settop box and is simply transmitted on a downstream channel to the same settop box. In contrast to the conventional arrangement, the user's independent communication device has no knowledge of the location or the capability of the settop box to which the requested service is to be delivered.

In further detail, the method of delivering video services as defined herein includes receiving a request for video services from a remote selection application via a public access network, in which the remote selection application is responsive to a user selection of the available media offerings such as VOD programming. The video service provider determines a type and identity of a client video device corresponding to the user for receiving the requested video services, and computes, based on the location of the client video device, a transmission medium for transporting the requested video services, such as a QAM (channel and frequency) receivable by the client video device. In order to "push" the requested service (program) to the client video device, the video service provider computes, based on the type of the client video device, a command for directing the client video device to receive the requested video service. Since the request does not originate from the client video device (i.e. settop box), the request does not bear the identity of the settop box nor does the settop box know to expect the service. The service provider then delivers the computed command followed by the requested video service.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In order to play VOD content, the subscriber must invoke a user interface operable to locate the content to play. A VOD client includes a guide or navigation application that provides the subscriber with a mechanism to browse or search for content. Due to the closed/proprietary nature of VOD client (e.g. settop box) programming and APIs, innovation in the guide has been limited. For example, typical guides available today are similar to the guides available years ago when there were only hundreds of content items. In many cases, it uses a hierarchical menu structure for browsing content. With thousands of content items or more, the guide in the VOD client is generally not a robust mechanism to locate content.

The Video Service Provider (VSP) may have subscribers that use one-way QAM devices. A one-way QAM device is a device that can only receive video and data from the network. The device cannot transmit data to the network. Therefore, a one-way QAM device does not have a VOD client. It cannot browse content or setup VOD sessions. It would be advantageous to find a way to allow these one-way QAM devices to participate in VOD delivery. This increases the value of the video service to the subscriber and potentially increases the revenue from additional VOD purchases. Configurations described further below bridge this gap by identifying the customer premises equipment (CPE) available, such as a QAM device, and determining an appropriate command sequence to invoke the client video device (QAM device) by "pushing" the requested content.

Figure 1:
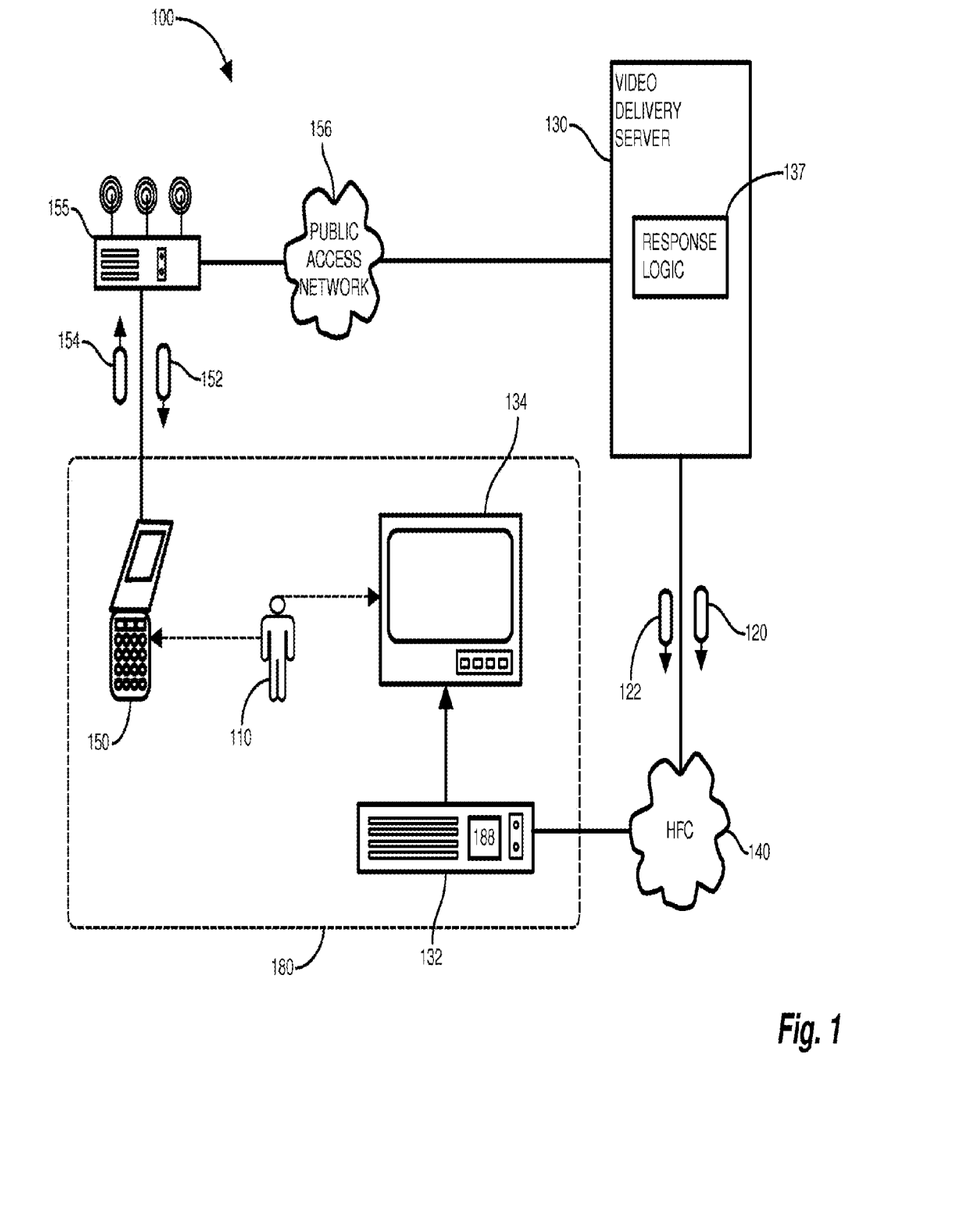
FIG. 1 is a context diagram of a video services environment suitable for use with configurations herein.

FIG. 1 is a context diagram of a video services environment suitable for use with configurations herein. Referring to FIG. 1, in a video services environment 100, a user 110 receives video services via video response messages 122 sent from a video delivery server 130 to a client video device 132, such as a settop box coupled to a rendering device, typically a TV or monitor. The user 110 employs a personal communication device 150 such as a cellphone, smartphone or other network conversant and or WiFi 155 enabled device for receiving content selections 152 and issuing a content request 154 via a public access network 156 such as the Internet to the video delivery server 130. The video delivery server 130 has response logic 137 to determine the identity of the requesting user 110, and from the identity determines a type and location of the client video device 132. Based on the determined type, the video delivery server 130 computes a startup command 122, and sends it to the determined location of the client video device 132 on a delivery network 140 such as a hybrid fiber coax (HFC) network. The client video device 132 continues to deliver video response messages 120 including the requested content based on the location and type of the client video device 132 for rendering and viewing by the user 110 on a rendering device 134, typically located adjacent to the client video device 132 in a customer premises 180 (i.e. home).

In contrast to conventional approaches, in which a request 154 and response 122 traverse upstream and downstream channels on the same HFC network 140, the request 154 emanates from an unrelated or independent location on an IP or other network 156, thus bearing no indication of the corresponding client video device 132. To identify the location of the client video device 132, the video delivery server 130 performs a mapping based on the identity of the user device 150 to determine the network location, and hence the QAM channels, coupled to the client video device 132 and the corresponding command 120 sequence for delivering the video content 122. QAM (Quadrature Amplitude Modulated) channels are typically allocated on a hybrid fiber-coax (HFC) network 140 for delivering video services, thus a QAM channel and frequency (or simply a QAM) are typically assigned, as described in the copending application cited above, however, alternate media transport mechanisms could be employed.

A settop box having a VOD client generally provides the most robust capability for VOD. As configurations below will illustrate, a variety of other QAM devices may be employed to receive VOD and other media services. The video service provider may have distributed digital terminal adapters (DTAs) to support the digital television conversion. A DTA converts a digital cable transmission for display on a television without the use of a settop box. The DTA is a one-way device that does not send messages to the applications in the network. It does not include a guide and cannot tune out of band data broadcasts. A subscriber can use an IP device 150 to locate and select content to watch. The content can be delivered to the DTA for display on the television.

Alternatively, the subscriber may prefer a portable IP device to search or browser for content to play due to its advanced UI features. For example, the subscriber may have a tablet computer (e.g. iPad®), mobile phone (e.g. iPhone® or Android™), or portable wifi device (e.g. iPod® Touch). These devices may have native applications or connect to a video service provider portal using HTML5 and JavaScript. Once content is selected, the subscriber wants the content routed to the QAM device for display. Other QAM devices may also be envisioned and will be apparent to those skilled in the art.

Figure 2:
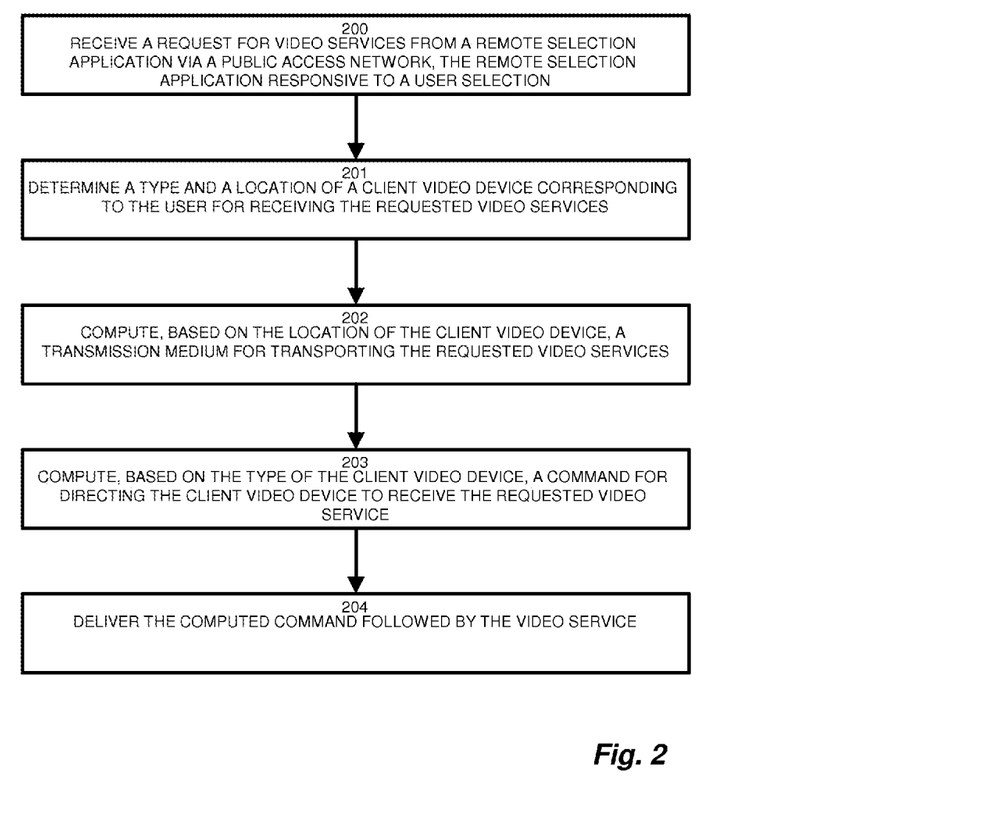
FIG. 2 is a flowchart of video service selection in the environment of FIG. 1

FIG. 2 is a flowchart of video service selection in the environment of FIG. 1. Referring to FIGS. 1 and 2, in the example environment 100, the method of delivering video services includes receiving a request for video services from a remote selection application via a public access network 156, the remote selection application responsive to a user selection, as depicted at step 200, and determining a type and location of a client video device 132 corresponding to the user 110 for receiving the requested video services, as disclosed at step 201. Based on the type of the client video device 132, the server 130 will generate an appropriate setup command 120 to direct the device 132 how to receive the requested service. Based on the location, the server 130 will identify an appropriate transmission medium, typically a QAM allocation, for delivering the requested service.

The server 130 computes, based on the determined location of the client video device 132, a transmission medium (QAM) for transporting the requested video services, as shown at step 202. When setting up a session with an IP Device to deliver video to a QAM device, the video delivery server 130 needs to locate the QAM device. There are a number of reasons that this is a challenge. High speed data/Internet service providers are different than the video service provider. Even with the same service provider for high speed data and video, downstream plants for high speed data and video do not align. Also, the client video device 132 (QAM device) may be a one-way device that cannot communicate its location to the headend. QAM devices (e.g. settop box or STB) are connected to the RF network in a particular service group and in a particular headend. Meanwhile, the IP device 150 is likely communicating through the web portal, whose servers are in a national data center, Thus complicating the location process.

The server 130 computes, based on the type of the client video device 132, the startup command 120 for directing the client video device to receive the requested video service 122, as depicted at step 203, and delivers the computed command 120 followed by the video service 122, as disclosed at step 204.

Figure 3:
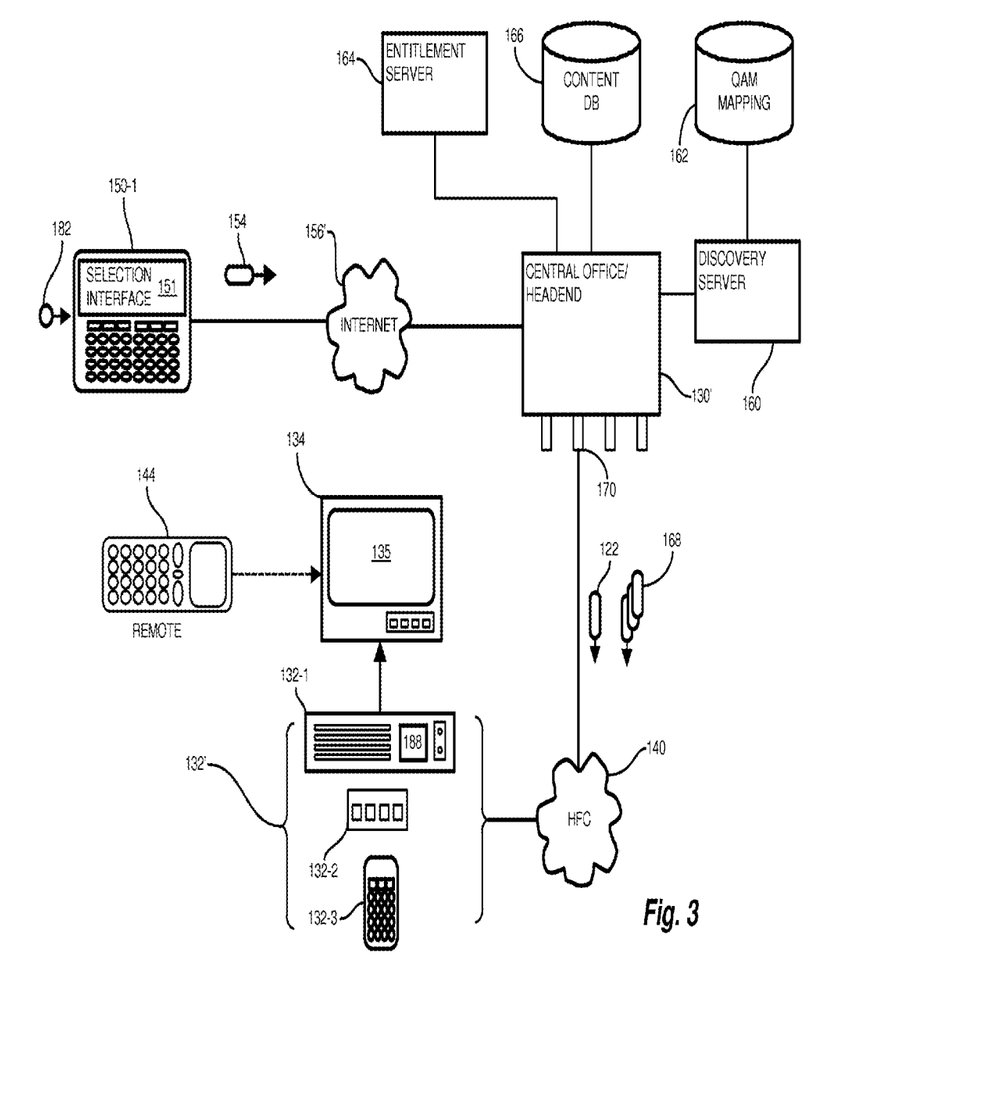
FIG. 3 is a block diagram of a Video on Demand (VOD) service request in the environment of FIG. 1.

FIG. 3 is a block diagram of a Video on Demand (VOD) service request in the environment of FIG. 1. Referring to FIGS. 1 and 3, a user 110 employs a selection interface 151 driven by the remote selection application 182 on the user device 150-1 to generate the content request 154. In the example configuration shown, the operations of the video delivery server 130 are fulfilled by a central office (CO)/headend 130', however other suitable content delivery system may be employed. The CO 130' receives the request 154 via the Internet 156, or other suitable public or private access network. Based on the request 154, a discovery server 160 employs a QAM mapping 162 to identify the network location of the client video device 132 in the HFC network 140. The discovery server 160 identifies video channels, such as QAMs, accessible to the client video device 132, using techniques such as those disclosed in copending U.S. patent application Ser. No. 12/956,236, filed Nov. 30, 2010, entitled DYNAMIC SERVICE GROUP DISCOVERY, incorporated herein by reference.

An entitlement server 164 confirms that the requested content is available to the user 110 by referencing subscriber and service agreement information, and a content database (DB) 166 retrieves the content 168 specified in the request 154. The central office 130' identifies a group interface 170 and channel having bandwidth for transmission, as outlined in copending U.S. patent application Ser. No. 13/024,849, filed Feb. 10, 2011, entitled MULTI-SERVICE BANDWIDTH ALLOCATION, incorporated herein by reference, using the identified client video device 132.

The client video device 132 has a type 132' indicating the receiving network entity located adjacent the rendering device 134, typically at the customer premises 180 (i.e. home or residence). These may include a settop box 132-1, a digital terminal adaptor (DTA) 132-2, or a cable card 132-3, as are known in the art. Depending on the type 132' of the client video device 132, the CO generates a startup command 120, specific to the device type 132', to instruct the device which channel to receive the content 168. The client video device 132, in general, is operable for receiving a stream of media via a plurality of available channels, and rendering the content on the adjacent rendering device 134, typically a TV. In contrast to conventional approaches, where a local control 144 (i.e. remote) is invoked to select content and channels for sending an upstream request to the CO 130', the request 154 emanates from the user device 150 that is independent from the HFC network 140 and bears no identity of the co-located client video device 132 in the customer premises 180. Following the startup command 120, the requested content 168 follows, usually as a stream of packets, for rendering on a display 135 of the rendering device 134.

Figure 4:
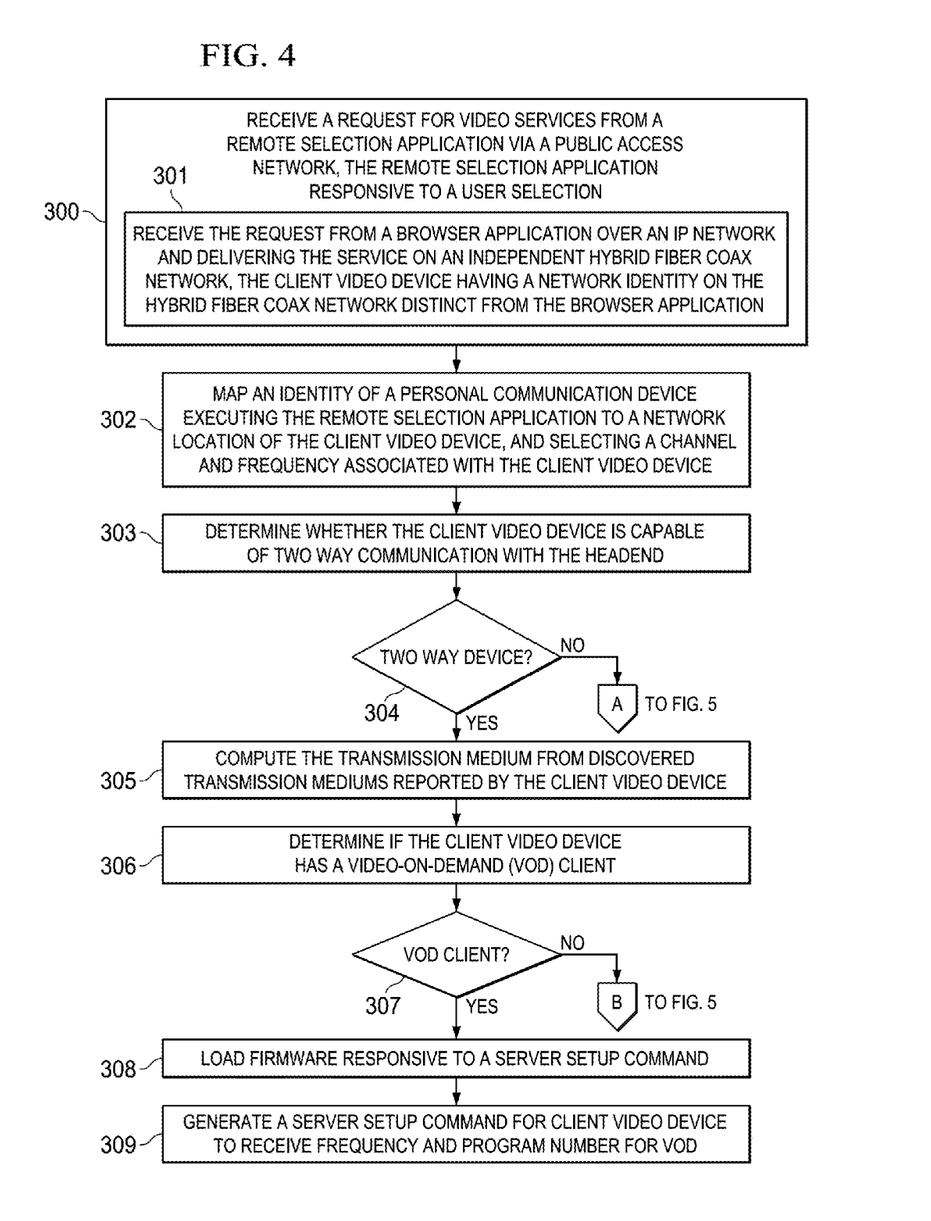
FIGS. 4-5 are a flowchart of VOD command processing as in FIG. 3.
Figure 5:
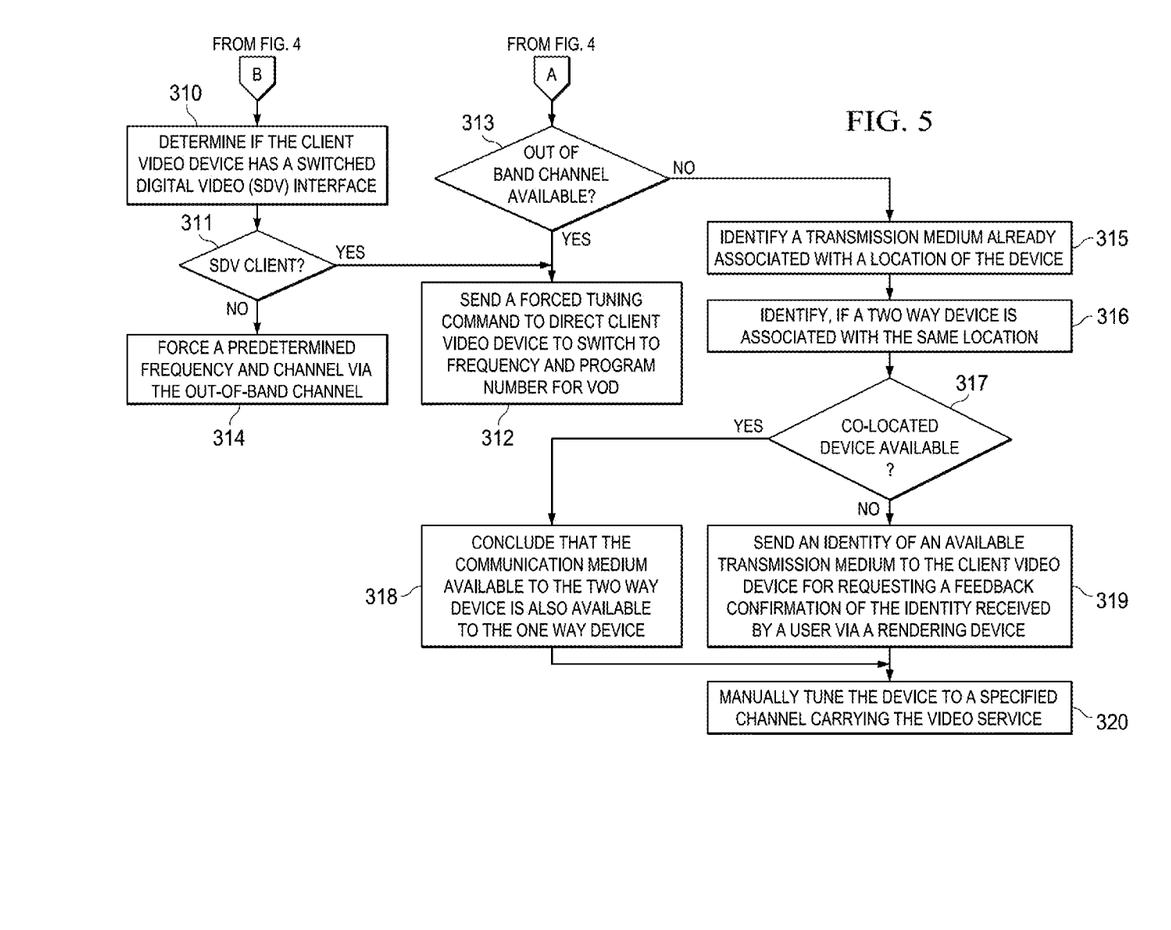

FIGS. 4-5 are a flowchart of VOD command processing as in FIG. 3. Referring to FIGS. 1, 3 and 4-5, at step 300, the method of delivering video services 168 includes receiving a request for video services 168 from a remote selection application 182 via a public access network 156, in which the remote selection application 182 is responsive to a user selection on a selection interface 151 driven by the remote selection application 182. The remote selection application 182 may be an application (App) for a cellphone or smartphone, and presents a graphical user interface (GUI) of video service offerings. Since the remote selection application 182 operates on a separate device, and not on the client video device 132, the application 182 has no direct ties or communication to the client video device 132 for identifying the customer premises 182 location of the client video device 132 and rendering device 134. Accordingly, any suitable platform and menus structure may be employed for the application 182. In the example arrangement, receiving the request 152 from the remote selection application 182 includes receiving the request from a browser application such as the remote selection application 182 over an IP network 156' and delivering the service on an independent hybrid fiber coax network 140, as depicted at step 301.

The client video device 132 has a network identity on the hybrid fiber coax network 140 distinct from the browser application (remote selection application 182). In the example arrangement, the user device 150 has an IP address assigned by an ISP (Internet service provider) supporting the device 150, while the client video device operates on a separate HFC network (140), which may also be an IP network, however having a different addressing mechanism.

A two-way QAM device is a device that can receive data and video from the headend 130' or data center and can send messages to applications in the headend or data center. One popular method of auto discovery for this class of device is to scan a known set of QAM frequencies in order to determine the MPEG-2 Transport Stream IDs (TSIDs) of the QAMs delivering video to this service group. The QAM device 132 then reports the QAM frequency and TSID pairs to the discovery server 160. Since all TSIDs are unique in a given region, the discovery server 160 discovers the QAMs that deliver video to the client devices. Additional details on discovery are disclosed in the copending application cited above.

Upon receiving the request 154, the CO 130' determines an address of the client video device 132, in which the request 154 emanates from an independent network location other than the client video device 132 (the user IP selection device 150). The CO 130' invokes the discovery server 160 for mapping an identity of a personal communication device 150 executing the remote selection application 182 to a network location of the client video device 132, and selects a channel and frequency associated with the client video device 132, as shown at step 302. The discovery server 160 accesses the QAM mapping for associating a network identify of the remote selection application 182 with a network location of the client video device 132, because the network identity (Internet service provider) is based on an independent numbering domain of network identities than a domain of network locations of the client video device 132 (HFC Network).

The discovery server 160 performs mapping an identity of a user 110 to corresponding client video devices 132, and identifies a frequency and channel of QAMs visible to the client video device 132. Computing the transmission medium further includes computing a video channel in communication with the client video device, and directing the client video device 132 to receive the requested service on the computed video channel. The CO 130' therefore computes, from a discovered mapping of transmission mediums to set top boxes, a QAM corresponding to the address of the client video device 132.

In addition to the network identity (location) of the client video device 132, the CO 130' also needs to identify the type of device 132' so that appropriate commands 120 may be sent to direct the device 132 to receive the requested media 168. The CO 130' performs a set of evaluations and checks for computing, based on the type of the client video device 132, a command 120 for directing the client video device 132 to receive the requested video service 168. As depicted at step 303, the CO 130' determines whether the client video device 132 is capable of two way communication with the headend (CO) 130'. If the device is a two-way device, at step 304, then the CO 130 only need compute the transmission medium from discovered transmission mediums reported by the client video device, as shown at step 305. Upon determining two-way capability in the client video device 132, a further check is performed to determine if the client video device 132 has a video-on-demand (VOD) client, as depicted at step 306. In configurations herein, VOD clients are capable of supporting a command from the server to setup a VOD session. This "push" command directs the client video device 132 which QAM to employ for the requested VOD, and further enables local control from the device 132 (i.e. settop box remote), as well as the IP device. If the client device 132 has a VOD client, at step 307, then the CO 130' loads (or ensures previous loading of) firmware responsive to a server setup command 120, as depicted at step 308, and generates a server setup command for client video device to receive frequency and program number for VOD, as depicted at step 309.

The availability of a VOD client allows the client video device 132 to respond to local control in addition to the user device 150 that commenced the service 168. Local control allows for so-called "trick mode" operations using the settop remote 144, such as fast forward, rewind and pause. The video client device 132 having (executing) a VOD client is coupled to a local control (i.e. remote) 144, such that the video client device 132 is responsive to both the local control 144 and the remote selection application 182 for controlling the video service 168.

If a VOD client is not available, at step 307, then upon determining two-way capability in the client video device 132, the CO 130' determines if the client video device 132 has a switched digital video (SDV) interface, as depicted at step 310. If an SDV interface is available, at step 311, then the CO sends a forced tuning command to direct the client video device 132 to switch to a frequency and program number (i.e. channel) for VOD, as disclosed at step 312. If, at step 307 no VOD client and no SDV client is available, then control passes to step 314 to force tune using an out of band channel, as discussed further below, since out of band is always available on a 2 way device. The two way devices 132 generally have at least one of VOD and SDV capability, allowing the CO 130' or other video delivery server 130 to direct the device 132 to switch to a channel on which the service 168 is to be delivered. One-way devices may entail operational feedback from the user since the client video device 132 cannot receive upstream signals from these devices.

A one-way QAM device is a device that can only receive data and video from the headend or data center. This device cannot transmit messages. Examples of these devices include a one-way CableCARD device and a digital terminal adapter (DTA). This class of device cannot execute the auto discovery sequence described above for two-way QAM device due to lack of return path. There are alternative methods to handle auto discovery for these devices.

In one configuration, a data carousel is carried in band on a known QAM channel. This data carousel may contain the ID of the QAM that delivers video to this service group. Alternatively, it may carry a set of frequencies to scan in order to discover the TSID of the MPEG-2 transport stream. The registration process consists of the subscriber tuning to a specific channel. When the QAM device tunes that channel, the QAM device receives the data on the in band carousel. It that data specifies set of frequencies to scan, the QAM device performs the frequency scan operation to discover the TSIDs. The QAM device displays the device ID and the auto discovery information on the television screen or display unit. The subscriber 110 (user) then registers the information with the video service provider 130, possibly using a web portal.

If a one-way device is employed as the client video device 132, then a check is performed, at step 313, to identify if an out of band channel is available. Cable card devices 132-3, which are adapted for insertion in a receptacle on the back of the rendering device 134, typically provide for out of band signaling information from the CO 130'. Digital terminal adaptors (DTAs) 132-2, discussed further below, typically may not. FCC compliance requires an ability to "force tune" client video devices for emergency broadcasts and the like. Accordingly, if the device 132 has an out-of band channel (video card), then the CO 130' forces a predetermined frequency and channel via the out-of-band channel to the QAM allocated by the CO 130' for the service 168.

If an out-of-band (OOB) capability is not present, as in a DTA device, then the CO 130' attempts to identify a transmission medium already associated with a location of the device, as depicted at step 315. Often, subscribers have multiple client devices such as the client video device 132 in a home. Since settop boxes are often marketed with features such as DVR and VOD capability, subscribers may install a robust device 132 on one TV and lesser featured devices on other TVs in the same home or residence to save costs. The QAM mapping DB 162 identifies all client devices 132' installed at a particular location, enabling identification of the location of any one device to indicate the co-located devices. Thus if VOD is requested on a device 132 in which all channels are in band, the CO 130' identifies, if a two way device is associated with the same location, as disclosed at step 316.

If a co-located device is available, as per the check at step 317, then the CO 130' concludes that the communication medium available to the two way device is also available to the one way device, as depicted at step 318, such that the same QAM feeding the location (residence) may be used. Otherwise, if a co-located device is not available, then the CO 130' sends an identity of an available transmission medium to the client video device 132 for requesting a feedback confirmation of the identity received by a user via a rendering device 134, as shown at step 319. Therefore, in order to identify an available QAM feeding the device 132, the CO 130' transmits a predetermined signal for receiving a manual confirmation from the user 134 that the channel and frequency of the QAM are received by the client video device 132. In the example arrangement, once the location is determined, this involves the subscriber manually tuning the device 132 to a specified channel carrying the video service, as depicted at step 320.

Those skilled in the art should readily appreciate that the programs and methods for providing video services as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of providing video services has been particularly shown and described with references to embodiments thereof, it will be understood by those skilled in the art that various changes in form and details may be made therein without departing from the scope of the invention encompassed by the appended claims.

What is claimed is:

1. A method of delivering video services comprising:
   receiving a request for video services from a remote selection application via a public access network, wherein the request for video services includes identification information related to the remote selection application;
   determining a type of a client video device for receiving the requested video services and a location associated with the client video device, wherein the request for the video services lacks customer premise location information for the client video device and lacks transmission information for the client video device;
   determining if the client video device is an out-of-band device having an out-of-band channel and forcing a predetermined frequency and channel via the out-of-band channel if the client video device has the out-of band channel;
   determining, based on the location associated with the client video device, a known transmission medium previously associated with the location associated with the client video device if the client video device is a one-way device and the known transmission medium was previously associated with the location associated with the client video device;
   determining that a communication medium available to a co-located two way device is also available to the client video device if the client video device is a one-way device and the co-located two way device is associated with the same location associated with the client video device; and
   sending an identity of an available transmission medium to the client video device for requesting a feedback confirmation of the identity received by a user via a rendering device if a co-located device is not available.

2. The method of claim 1 wherein determining the type and location of the client video device comprises:
   determining, based on the received request, an address of the client video device, the address known to the head-end for providing the video services, the request emanating from an independent network location different than the client video device; and
   computing, from a discovered mapping of transmission mediums to set top boxes, a quadrature amplitude modulation (QAM) corresponding to the address of the client video device.

3. The method of claim 1 further comprising:
   computing a transmission medium for transporting the requested video services;
   computing a video channel in communication with the client video device, and directing the client video device to receive the requested video services on the computed video channel.

4. The method of claim 3 further comprising:
mapping an identity of a user device to corresponding client video devices; and
identifying a frequency and a channel from quadrature amplitude modulations (QAMs) visible to the client video device.

5. The method of claim 1 further comprising, upon determining two-way capability in the client video device, determining if the client video device has a video-on-demand (VOD) client, and if so:
loading firmware responsive to a server setup command; and
generating a server setup command for the client video device to receive a frequency and a program number for VOD.

6. The method of claim 5 wherein the client video device is coupled to a local control, the client video device responsive to both the local control and the remote selection application for controlling the requested video services.

7. The method of claim 1 further comprising, upon determining two-way capability in the client video device, determining if the client video device has a switched digital video (SDV) interface, and if so:
sending a forced tuning command to direct the client video device to switch to frequency and program number for video-on-demand (VOD).

8. The method of claim 1 wherein receiving the request from the remote selection application further comprises:
receiving the request for video services from a browser application over an IP network; and
delivering the requested video services on an independent hybrid fiber coax (HFC) network, the client video device having a network identity on the HFC network distinct from the browser application.

9. The method of claim 8 further comprising mapping an identity of a personal communication device executing the remote selection application to a network location of the client video device, and selecting a channel and frequency associated with the client video device.

10. The method of claim 8 further comprising associating a network identify of the remote selection application with a network location of the client video device, the network identity based on an independent numbering domain of network identities than a domain network location.

11. The method of claim 1, wherein determining the type and location of the client video device for receiving the requested video services is based the identity of the remote selection application.

12. The method of claim 1, further comprising:
performing a mapping based on an identity of the remote selection application to determine a network location of the client video device.

13. The method of claim 1, further comprising:
determining, based on the type of the client video device, a command for directing the client video device to receive the requested video services; and
delivering the computed command followed by the video services, wherein the command includes a data carousel if the client video device operates as the one-way device.

14. A video delivery server comprising:
a headend configured to receive a request for video services from a remote selection application via a public access network, wherein the request for video services includes identification information related to the remote selection application;
a discovery server for determining a type of a client video device for receiving the requested video services and a location associated with the client video device, wherein the request for the video services lacks customer premise location information for the client video device and lacks transmission information for the client video device, wherein the video delivery server forces a predetermined frequency and channel via an out-of-band channel if the client video device has the out-of band channel;
a quadrature amplitude modulation (QAM) mapping for computing, based on the location of the client video device, a transmission medium for transporting the requested video services, wherein the transmission medium is computed from discovered transmission mediums reported by the client video device if the client video device is a two-way device, wherein a known transmission medium previously associated with the location associated with the client video device is computed if the client video device is a one-way device and the known transmission medium was previously associated with the location associated with the client video device, wherein a same communication medium available to a co-located two way device is computed if the client video device is a one-way device and the co-located two way device is available and is associated with the same location associated with the client video device;
the headend having a session manager responsive to the request for computing, based on the type of the client video device, a command for directing the client video device to receive the requested video services, wherein the command includes a data carousel if the client video device operates as a one-way device and an identity of an available transmission medium to the client video device for requesting a feedback confirmation of the identity received by a user via a rendering device if a co-located device is not available; and
an interface to a hybrid fiber coax (HFC) network for delivering the computed command followed by the video service.

15. The video delivery server of claim 14 wherein the discovery server is further configured to:
determine, based on the received request for computing, an address of the client video device, the address known to the headend for providing the video services, the request for computing emanating from an independent network location different than the client video device; and
compute, from a discovered mapping of transmission mediums to set top boxes, a QAM corresponding to the address of the client video device.

16. The video delivery server of claim 14 wherein the video delivery server invokes the QAM mapping to:
compute a video channel in communication with the client video device, and
direct the client video device to receive the requested video services on a computed video channel.

17. The video delivery server of claim 14 further configured to, upon determining two-way capability in the client video device, determine if the client video device has a video-on-demand (VOD) client, and if so:
load firmware responsive to a server setup command; and
generate a server setup command for the client video device to receive a frequency and a program number for VOD.

18. The video delivery server of claim 17 further configured to, upon determining two-way capability in the client video device, determine if the client video device has a switched digital video (SDV) interface, and if so:
  sending a forced tuning command to direct client video device to switch to a frequency and a program number for VOD.

19. The video delivery server of claim 14 wherein receiving the request for video services from the remote selection application further comprises:
  receiving the request for video services from a browser application over an IP network; and
  delivering the requested video services on an independent hybrid fiber coax (HFC) network, the client video device having a network identity on the hybrid fiber coax network distinct from the browser application.

20. The video delivery server of claim 13 wherein computing the command for directing the client video device includes receiving a user command for tuning to a specified channel carrying the requested video services.

21. A computer program product having an encoded set of processor based instructions on a non-transitory computer readable storage medium for performing a method of delivering video services comprising:
  receiving a request for video services from a remote selection application via a public access network, wherein the request for video services includes identification information related to the remote selection application;
  determining a type of a client video device for receiving the requested video services and a location associated with the client video device, the request for video services emanating from an independent network location different than the client video device, wherein the request for the video services lacks customer premise location information for the client video device and lacks transmission information for the client video device;
  determining if the client video device is an out-of-band device having an out-of-band channel and forcing a predetermined frequency and channel via the out-of-band channel if the client video device has the out-of band channel;
  determining, based on the location associated with the client video device, a known transmission medium previously associated with the location associated with the client video device if the client video device is a one-way device and the known transmission medium was previously associated with the location associated with the client video device;
  determining that a communication medium available to a co-located two way device is also available to the client video device if the co-located two way device is associated with the same location as the location associated with the client video device; and
  sending an identity of an available transmission medium to the client video device for requesting a feedback confirmation of the identity received by a user via a rendering device if a co-located device is not available.

* * * * *